United States Patent
Kitagawa

(10) Patent No.: US 11,150,435 B2
(45) Date of Patent: Oct. 19, 2021

(54) LENS APPARATUS

(71) Applicant: MITUTOYO CORPORATION, Kanagawa (JP)

(72) Inventor: Kazuki Kitagawa, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 192 days.

(21) Appl. No.: 16/594,185

(22) Filed: Oct. 7, 2019

(65) Prior Publication Data

US 2020/0142151 A1    May 7, 2020

(30) Foreign Application Priority Data

Nov. 1, 2018 (JP) .............................. JP2018-206273

(51) Int. Cl.
  *G02B 7/02* (2021.01)
(52) U.S. Cl.
  CPC .............. *G02B 7/023* (2013.01); *G02B 7/021* (2013.01)
(58) Field of Classification Search
  CPC .......... G02B 7/021; G02B 7/023; G02B 7/10; G02B 7/08; G02B 7/04; G02B 7/102; G02B 7/026; G02B 7/022
  See application file for complete search history.

(56) References Cited

U.S. PATENT DOCUMENTS

| | | | | |
|---|---|---|---|---|
| 2003/0011902 | A1* | 1/2003 | Nishimura | G02B 7/025 359/819 |
| 2003/0128973 | A1* | 7/2003 | Shinohara | G02B 7/10 396/25 |
| 2007/0121222 | A1* | 5/2007 | Watanabe | G02B 7/023 359/811 |
| 2018/0364545 | A1* | 12/2018 | Wang | G02B 7/023 |

FOREIGN PATENT DOCUMENTS

| | | |
|---|---|---|
| JP | H3-136011 A | 6/1991 |
| JP | 2006-330210 A | 12/2006 |

* cited by examiner

*Primary Examiner* — Marin Pichler
*Assistant Examiner* — Ephrem Z Mebrahtu
(74) *Attorney, Agent, or Firm* — Oliff PLC

(57) ABSTRACT

The present invention includes a plurality of lenses that are disposed such that optical axes are aligned in an axial direction, a first lens frame that holds a first lens of the plurality of lenses, and a second lens frame that holds a second lens of the plurality of lenses. The first lens frame comes into contact with the second lens frame and is disposed on one side of the second lens frame in the axial direction. The second lens frame includes a penetration hole penetrating the second lens frame from the other side in the axial direction to the one side in the axial direction. Air is suctioned and discharged via the penetration hole such that the first lens frame and the second lens frame are temporarily fixed through vacuum adsorption.

6 Claims, 5 Drawing Sheets

LENS APPARATUS

BACKGROUND OF THE INVENTION

Field of the Invention

The present invention relates to a lens apparatus having a plurality of lenses disposed therein.

Description of Related Art

A lens apparatus such as an object lenses, for example, is constituted of a lens group having a plurality of lenses. Each of a plurality of lenses is fixed to a lens frame, for example, and this lens frame is accommodated in and fixed to a lens barrel (main body). At this time, the performance required for a lens apparatus may not be able to be exhibited depending on the position of each lens inside the lens barrel. Here, in order to achieve the performance required for a lens apparatus, for example, positions of lenses need to be adjusted.

Japanese Patent Laid-Open No. 2006-330210 discloses eccentricity adjustment performed when fixing lenses to a lens frame. In the invention disclosed in Japanese Patent Laid-Open No. 2006-330210, instead of mounting lenses in a manner in which optical surfaces thereof abut a lens frame for storing lenses, lenses are held by a lens holding tool, and optical axes of the lenses and a central axis of the lens frame are caused to coincide with each other by controlling deviation (shift) and inclination (tilt). According to this invention disclosed in Japanese Patent Laid-Open No. 2006-330210, eccentricity adjustment of lenses can be performed with high accuracy without increasing machining accuracy of the lens frame affecting centering of lenses.

In addition, Japanese Patent Laid-Open No. H3-136011 discloses an attachment adjusting method for a lens frame (lens barrel) in a structure in which a lens frame is referred to as a lens barrel and a lens barrel equipped with lenses is housed in a lens holder. In the invention disclosed in Japanese Patent Laid-Open No. H3-136011, the lens barrel is adsorbed using an attachment adjusting tool to be able to move inside the lens holder, such that the position of the lens barrel inside the lens holder can be adjusted.

Incidentally, in a lens apparatus with a lens barrel accommodating a lens frame to which lenses are fixed, the lenses (that is, the lens frame) need to be fixed inside the lens barrel in a stage of a finished product. On the other hand, when adjusting lens positions, the lens frame has to be movable without being completely fixed inside the lens barrel. Therefore, it is conceivable that the lens frame is temporarily fixed when the lens positions are adjusted and the lens frame is completely fixed after adjustment. However, in this case, the lens frame is moved against a fixing force of the temporarily fixed state, thereby resulting in a problem of difficulties in precise adjustment.

In addition, when adjusting lens positions, it is conceivable that the lens frame is moved by externally touching it. However, if a lens barrel of a lens apparatus in a stage of a finished product has many openings through which a user can come into contact with a lens frame from the outside, there is concern that lens positions may be misaligned. Accordingly, it is desirable that the number of openings through which a user can come into contact with an accommodated lens frame from the outside be as few as necessary. Therefore, when adjusting lens positions, it is conceivable that an adjusting main body having openings on a side surface is used in place of a lens barrel. In this case, a positionally adjusted lens group is pulled out from the adjusting main body and is accommodated in a lens barrel. However, in the related art, there was no means for fixing a plurality of lenses in an adjusted state, and there was no other option than to store information regarding lens frames and sizes of spacers to be put therebetween and to reproduce it inside a lens barrel. In this case, particularly, when there are many lenses to be accommodated in the lens barrel, there is a problem of difficulties in reproducing the adjusted state.

In the invention disclosed in Japanese Patent Laid-Open No. 2006-330210, adjustment performed when lenses are fixed to a lens frame is disclosed, but nothing is disclosed regarding adjustment of a lens apparatus in which a plurality of lens frames are accommodated in a lens barrel.

In addition, in the invention disclosed in Japanese Patent Laid-Open No. H3-136011, although adjustment performed when one lens frame is accommodated in a lens holder is disclosed, nothing is disclosed regarding adjustment of a lens apparatus in which a plurality of lens frames are accommodated in a lens barrel.

SUMMARY OF THE INVENTION

According to an embodiment of the present invention, lens positions are easily and accurately adjusted in a lens apparatus having a plurality of lenses.

The embodiment of the present invention includes a plurality of lenses that are disposed such that optical axes are aligned in an axial direction, a first lens frame that holds a first lens of the plurality of lenses, and a second lens frame that holds a second lens of the plurality of lenses. The first lens frame comes into contact with the second lens frame and is disposed on one side of the second lens frame in the axial direction. The second lens frame includes a penetration hole penetrating the second lens frame from the other side in the axial direction to the one side in the axial direction. Air is suctioned and discharged via the penetration hole such that the first lens frame and the second lens frame are temporarily fixed through vacuum adsorption.

Further features of the present invention will become apparent from the following description of exemplary embodiments with reference to the attached drawings.

DETAILED DESCRIPTION OF THE INVENTION

Hereinafter, a lens apparatus according to the present invention will be described in detail with reference to the drawings. In the following drawings, in order to facilitate understanding of each constitution, there are cases where the scales, the numbers, and the like of structures differ from those of actual structures.

Figure 1:
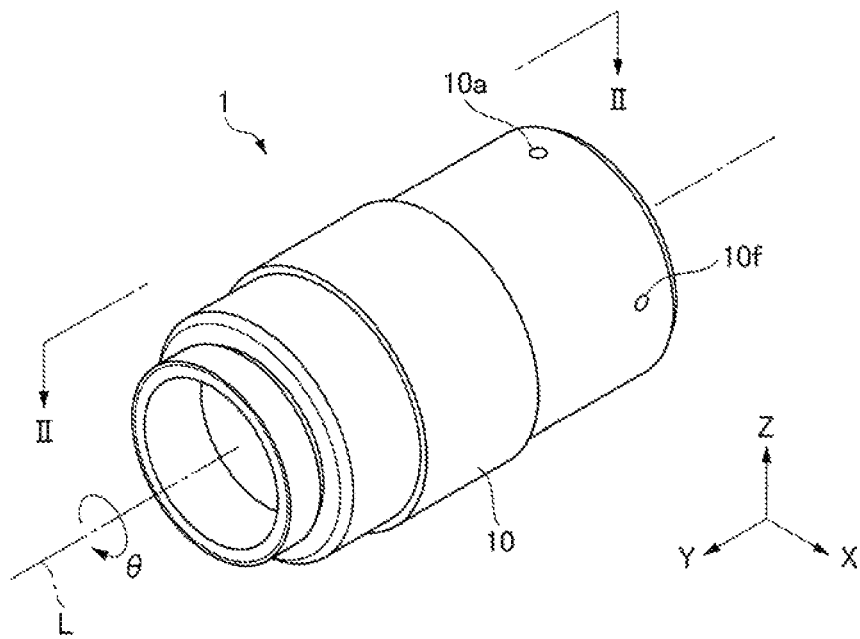
FIG. 1 is a perspective view illustrating a lens apparatus according to Example 1 of the present invention.

In addition, in the drawings, an XYZ coordinate system is suitably indicated as a three-dimensional orthogonal coordinate system. In the XYZ coordinate system, a Z-axis direction is a vertical direction having a positive side as an upper side and having a negative side as a lower side, as illustrated in FIG. 1. In addition, the positive side in the vertical direction will be referred to as "one side in the vertical direction", and the negative side in the vertical direction will be referred to as "the other side in the vertical direction". A Y-axis direction is a direction parallel to a central axis L extending in one direction as illustrated in FIG. 1 and is a direction orthogonal to the vertical direction. In the following description, a direction parallel to the central axis L, that is, the Y-axis direction will be referred to as "an axial direction". In addition, a positive side in the axial direction will be referred to as "one side in the axial direction", and a negative side in the axial direction will be referred to as "the other side in the axial direction". An X-axis direction is a direction orthogonal to both the axial direction and the vertical direction. In the following description, the X-axis direction will be referred to as "a width direction". In addition, a positive side in the width direction will be referred to as "one side in the width direction", and a negative side in the width direction will be referred to as "the other side in the width direction".

In addition, a radial direction about the central axis L will be simply referred to as "a radial direction", and a circumferential direction θ around the axis, that is, about the central axis L will be simply referred to as "a circumferential direction". In addition, in the circumferential direction θ, when viewed from the other side in the axial direction toward the one side in the axial direction, a clockwise side, that is, a side where the arrow is pointing in the circumferential direction θ in the diagram will be referred to as "one side in the circumferential direction", and a counterclockwise side, that is, a side opposite to the side where the arrow is pointing in the circumferential direction θ in the diagram will be referred to as "the other side in the circumferential direction".

The vertical direction, the axial direction, the width direction, the upper side, and the lower side are merely names for describing the relative positional relationships between portions. Actual disposition relationships or the like may be disposition relationships or the like other than disposition relationships or the like expressed using these names. In addition, in this specification, directions such as forward, rearward, right, left, upward, and downward indicate directions as viewed in the drawings and do not limit the directions when the apparatus according to the present invention is used.

In this specification, a state of extending in the X-axis direction, the Y-axis direction, or the Z-axis direction also includes a case of extending in a direction inclined within a range less than 45° with respect to the X-axis direction, the Y-axis direction, or the Z-axis direction, in addition to a case of extending strictly in the X-axis direction, the Y-axis direction, or the Z-axis direction.

Example 1

(Structure of Lens Apparatus 1)

Figure 2:
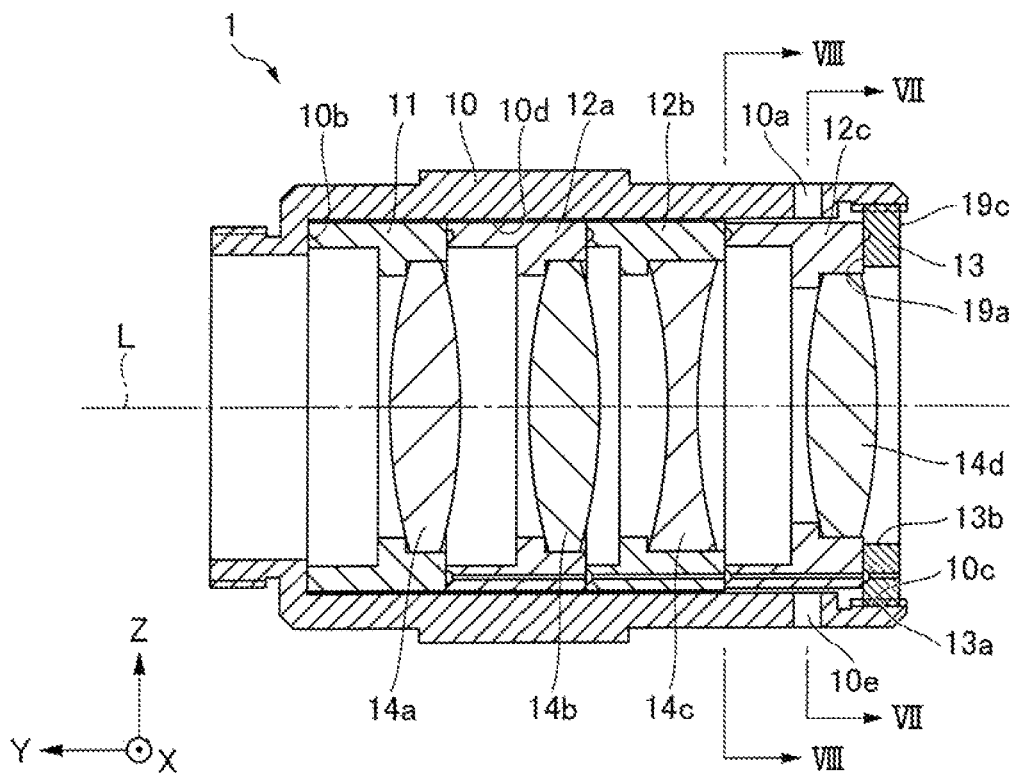
FIG. 2 is a cross-sectional view taken along II-II regarding a lens apparatus 1 illustrated in FIG. 1 and is a cross-sectional view in a plane along a central axis L.

FIG. 1 is a perspective view illustrating a lens apparatus according to Example 1 of the present invention. FIG. 2 is a cross-sectional view taken along II-II regarding a lens apparatus 1 illustrated in FIG. 1 and is a cross-sectional view in a plane along the central axis L. The lens apparatus 1 is constituted to have lenses 14a, 14b, 14c, and 14d which are accommodated in a lens barrel (main body) 10. The lens barrel 10 has a barrel hole 10d which penetrates the lens barrel 10 from the other side in the axial direction to the one side in the axial direction and in which lens frames 11, 12a, 12b, and 12c can slide. The centers of the lens barrel 10 and the barrel hole 10d of the lens barrel 10 are disposed along the central axis L. The barrel hole 10d has a stepped portion 10b on the one side in the axial direction such that the one side in the axial direction has a smaller diameter than the other side in the axial direction. At a position of an opening on the other side of the barrel hole 10d in the axial direction, the lens barrel 10 has a screw portion 10c in the inner circumference. The outer diameters of the lens frames 11, 12a, 12b, and 12c are slightly smaller than the inner diameter of the barrel hole 10d. Accordingly, the lens frames 11, 12a, 12b, and 12c can be inserted into the barrel hole 10d. The outer diameter of the lens frame 12c is slightly smaller than the outer diameters of the lens frames 11, 12a, and 12b. Therefore, a clearance between the inner diameter of the barrel hole 10d and the outer diameter of the lens frame 12c is larger than a clearance between the inner diameter of the barrel hole 10d and the outer diameters of the lens frames 11, 12a, and 12b. Due to this clearance between the inner diameter of the barrel hole 10d and the outer diameter of the lens frame 12c, eccentricity of a lens group can be adjusted by touching an outer circumferential surface of the lens frame 12c via eccentricity adjustment holes 10a, 10e, 10f, and 10g.

Figure 3:
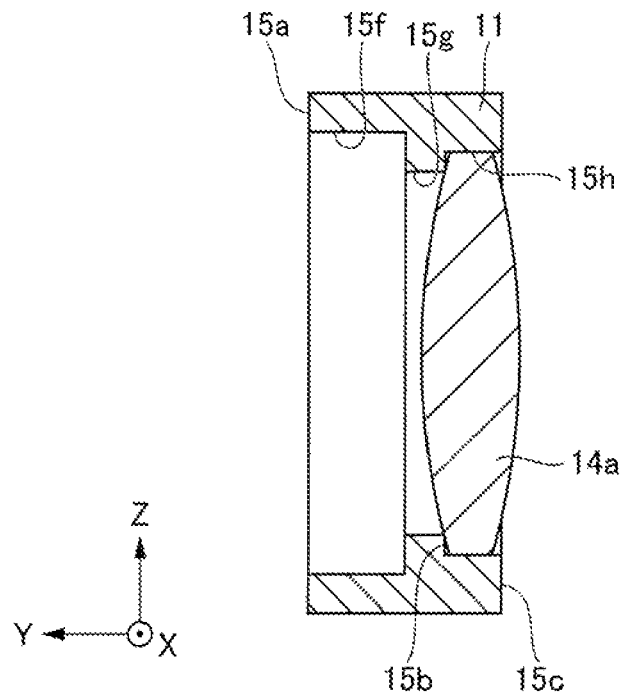
FIG. 3 is a lateral cross-sectional view of a lens frame 11 and a lens 14a illustrated in FIG. 2.

FIG. 3 is a lateral cross-sectional view of the lens frame 11 and the lens 14a illustrated in FIG. 2. The lens 14a is fixed to the lens frame 11. The centers of the lens 14a and the lens frame 11 are disposed along the central axis L. The lens frame 11 is an annular member having an end surface 15a which is an end surface on the one side in the axial direction and an end surface 15c which is an end surface on the other side in the axial direction and having holes 15f, 15g, and 15h which penetrate the lens frame 11 in the axial direction. The centers of the holes 15f, 15g, and 15h are disposed along the central axis L. The diameter of the hole 15h is slightly larger than the outer diameter of the lens 14a fixed to the lens frame 11. The diameter of the hole 15g is smaller than the outer diameter of the lens 14a. A stepped portion 15b is formed due to this difference between the diameter of the hole 15g and the diameter of the hole 15h. In the lens 14a fitted into the hole 15h from the other side in the axial direction, an edge part on the outer side in the radial direction abuts the stepped portion 15b and is fixed thereto such that it does not move any further to the one side in the axial direction. The lens 14a may be fixed to the lens frame 11 using an adhesive, for example. The diameter of the hole 15f is larger than the diameter of the hole 15h. The sizes of the diameters of the holes 15f, 15g, and 15h can be set in accordance with the size of the outer diameter of the lens 14a to be fixed.

Figure 4:
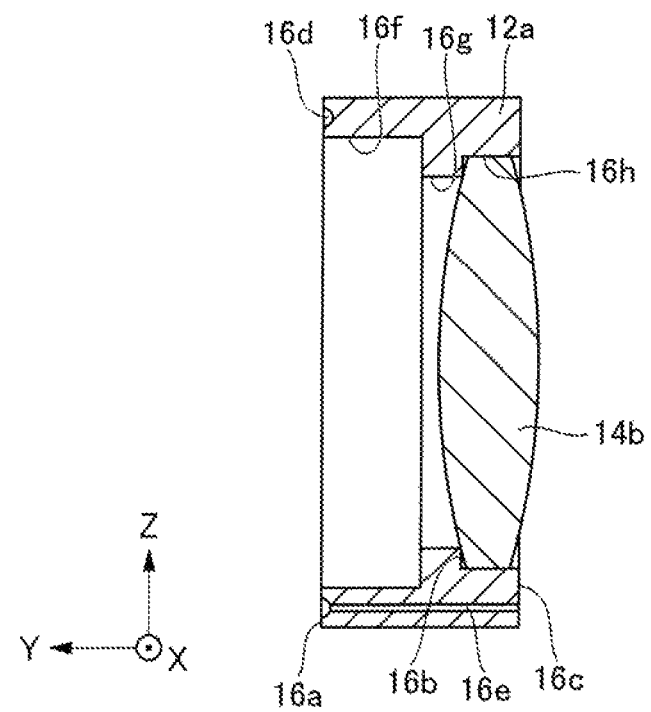
FIG. 4 is a lateral cross-sectional view of a lens frame 12a and a lens 14b illustrated in FIG. 2.

FIG. 4 is a lateral cross-sectional view of the lens frame 12a and the lens 14b illustrated in FIG. 2. The lens 14b is fixed to the lens frame 12a. The centers of the lens 14b and the lens frame 12a are disposed along the central axis L. The lens frame 12a is an annular member having an end surface 16a which is an end surface on the one side in the axial direction and an end surface 16c which is an end surface on the other side in the axial direction and having holes 16f, 16g, and 16h which penetrate the lens frame 12a in the axial direction. The centers of the holes 16*f*, 16*g*, and 16*h* are disposed along the central axis L. The diameter of the hole 16*h* is slightly larger than the outer diameter of the lens 14*b* fixed to the lens frame 12*a*. The diameter of the hole 16*g* is smaller than the outer diameter of the lens 14*b*. A stepped portion 16*b* is formed due to this difference between the diameter of the hole 16*g* and the diameter of the hole 16*h*. In the lens 14*b* fitted into the hole 16*h* from the other side in the axial direction, an edge part on the outer side in the radial direction abuts the stepped portion 16*b* and is fixed thereto such that it does not move any further to the one side in the axial direction. The lens 14*b* may be fixed to the lens frame 12*a* using an adhesive, for example. The diameter of the hole 16*f* is larger than the diameter of the hole 16*h*. The sizes of the diameters of the holes 16*f*, 16*g*, and 16*h* can be set in accordance with the size of the outer diameter of the lens 14*b* to be fixed.

The lens frame 12*a* has a penetration hole 16*e* penetrating the lens frame 12*a* from the other side in the axial direction to the one side in the axial direction at a position on the outer side of the hole 16*f* in the radial direction and on the inner side of the outer circumference of the lens frame 12*a* in the radial direction. The penetration hole 16*e* extends along the central axis L. In addition, the lens frame 12*a* has a groove portion 16*d* recessed to the other side in the axial direction on the end surface 16*a*. The groove portion 16*d* has a circular shape (annular shape) extending in the circumferential direction around the axis, that is, about the central axis L.

Figure 5:
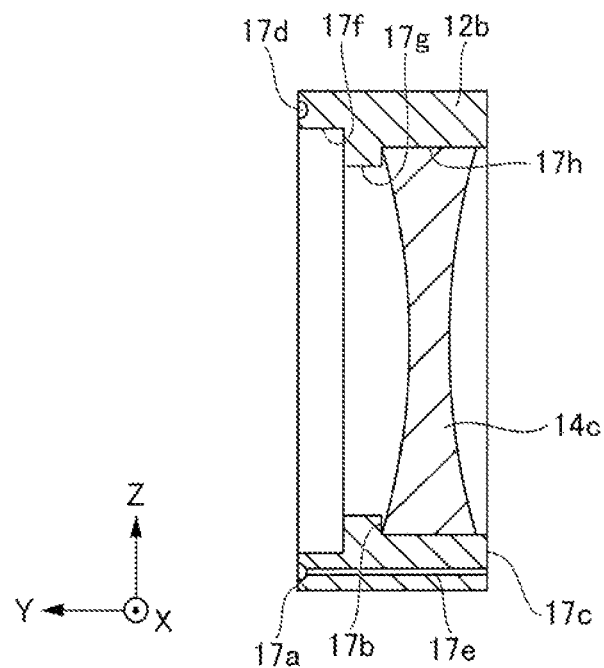
FIG. 5 is a lateral cross-sectional view of a lens frame 12b and a lens 14c illustrated in FIG. 2.

FIG. 5 is a lateral cross-sectional view of the lens frame 12*b* and the lens 14*c* illustrated in FIG. 2. The lens 14*c* is fixed to the lens frame 12*b*. The centers of the lens 14*c* and the lens frame 12*b* are disposed along the central axis L. The lens frame 12*b* is an annular member having an end surface 17*a* which is an end surface on the one side in the axial direction and an end surface 17*c* which is an end surface on the other side in the axial direction and having holes 17*f*, 17*g*, and 17*h* which penetrate the lens frame 12*b* in the axial direction. The centers of the holes 17*f*, 17*g*, and 17*h* are disposed along the central axis L. The diameter of the hole 17*h* is slightly larger than the outer diameter of the lens 14*c* fixed to the lens frame 12*b*. The diameter of the hole 17*g* is smaller than the outer diameter of the lens 14*c*. A stepped portion 17*b* is formed due to this difference between the diameter of the hole 17*g* and the diameter of the hole 17*h*. In the lens 14*c* fitted into the hole 17*h* from the other side in the axial direction, an edge part on the outer side in the radial direction abuts the stepped portion 17*b* and is fixed thereto such that it does not move any further to the one side in the axial direction. The lens 14*c* may be fixed to the lens frame 12*b* using an adhesive, for example. The diameter of the hole 17*f* is larger than the diameter of the hole 17*h*. The sizes of the diameters of the holes 17*f*, 17*g*, and 17*h* can be set in accordance with the size of the outer diameter of the lens 14*c* to be fixed.

The lens frame 12*b* has a penetration hole 17*e* penetrating the lens frame 12*b* from the other side in the axial direction to the one side in the axial direction at a position on the outer side of the hole 17*f* in the radial direction and on the inner side of the outer circumference of the lens frame 12*b* in the radial direction. The penetration hole 17*e* extends along the central axis L. In addition, the lens frame 12*b* has a groove portion 17*d* recessed to the other side in the axial direction on the end surface 17*a*. The groove portion 17*d* has a circular shape extending in the circumferential direction around the axis, that is, about the central axis L.

Figure 6:
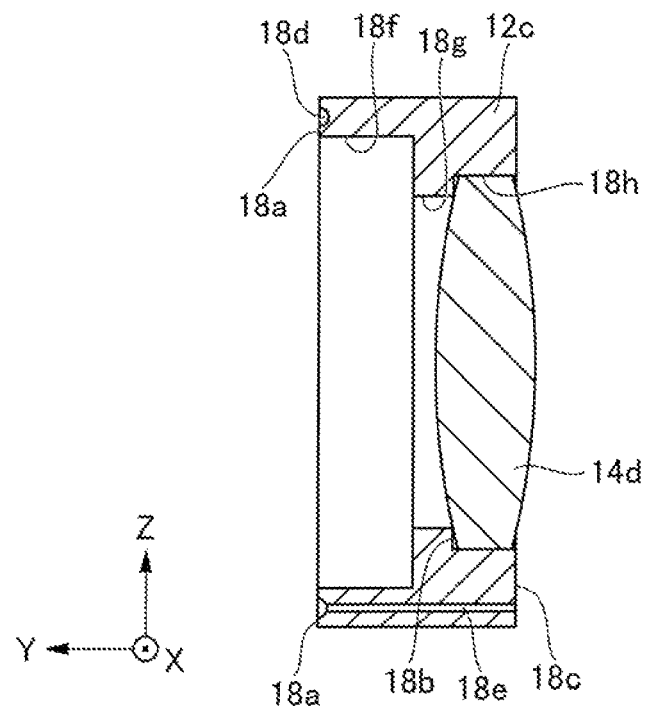
FIG. 6 is a lateral cross-sectional view of a lens frame 12c and a lens 14d illustrated in FIG. 2.

FIG. 6 is a lateral cross-sectional view of the lens frame 12*c* and the lens 14*d* illustrated in FIG. 2. The lens 14*d* is fixed to the lens frame 12*c*. The centers of the lens 14*d* and the lens frame 12*c* are disposed along the central axis L. The lens frame 12*c* is an annular member having an end surface 18*a* which is an end surface on the one side in the axial direction and an end surface 18*c* which is an end surface on the other side in the axial direction and having holes 18*f*, 18*g*, and 18*h* which penetrate the lens frame 12*c* in the axial direction. The centers of the holes 18*f*, 18*g*, and 18*h* are disposed along the central axis L. The diameter of the hole 18*h* is slightly larger than the outer diameter of the lens 14*d* fixed to the lens frame 12*c*. The diameter of the hole 18*g* is smaller than the outer diameter of the lens 14*d*. A stepped portion 18*b* is formed due to this difference between the diameter of the hole 18*g* and the diameter of the hole 18*h*. In the lens 14*d* fitted into the hole 18*h* from the other side in the axial direction, an edge part on the outer side in the radial direction abuts the stepped portion 18*b* and is fixed thereto such that it does not move any further to the one side in the axial direction. The lens 14*d* may be fixed to the lens frame 12*c* using an adhesive, for example. The diameter of the hole 18*f* is larger than the diameter of the hole 18*h*. The sizes of the diameters of the holes 18*f*, 18*g*, and 18*h* can be set in accordance with the size of the outer diameter of the lens 14*d* to be fixed.

The lens frame 12*c* has a penetration hole 18*e* penetrating the lens frame 12*c* from the other side in the axial direction to the one side in the axial direction at a position on the outer side of the hole 18*f* in the radial direction and on the inner side of the outer circumference of the lens frame 12*c* in the radial direction. The penetration hole 18*e* extends along the central axis L. In addition, the lens frame 12*c* has a groove portion 18*d* recessed to the other side in the axial direction on the end surface 18*a*.

Figure 7:
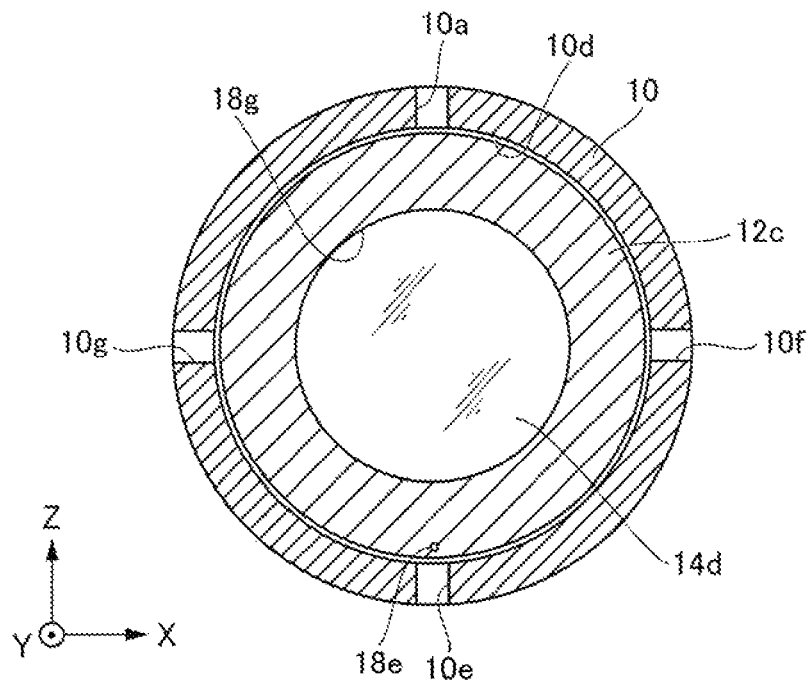
FIG. 7 is a cross-sectional view of the lens apparatus 1 at a position indicated with an arrow VII-VII in FIG. 2.

FIG. 7 is a cross-sectional view of the lens apparatus 1 at a position indicated with an arrow VII-VII in FIG. 2. The lens barrel 10 has the eccentricity adjustment hole 10*a* penetrating the lens barrel 10 in the radial direction on the one side in the Z-axis direction, the eccentricity adjustment hole 10*e* penetrating the lens barrel 10 in the radial direction on the other side in the Z-axis direction, the eccentricity adjustment hole 10*f* penetrating the lens barrel 10 in the radial direction on the one side in the X-axis direction, and the eccentricity adjustment hole 10*g* penetrating the lens barrel 10 in the radial direction on the other side in the X-axis direction. As illustrated in FIG. 2, the eccentricity adjustment holes 10*a*, 10*e*, 10*f*, and 10*g* are provided at positions facing the outer circumferential surface of the lens frame 12*c* accommodated in the barrel hole 10*d* in the axial direction.

Figure 8:
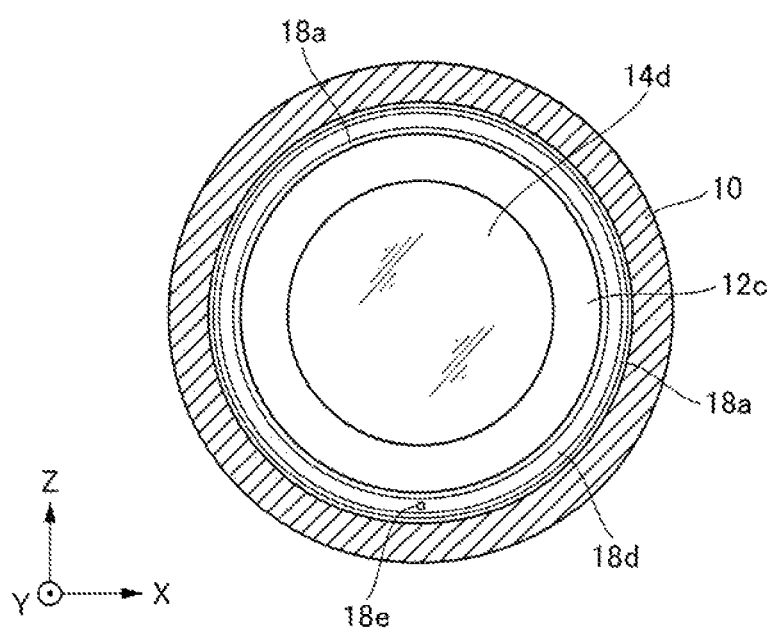
FIG. 8 is a cross-sectional view of the lens apparatus 1 at a position indicated with an arrow VIII-VIII in FIG. 2.

FIG. 8 is a cross-sectional view of the lens apparatus 1 at a position indicated with an arrow VIII-VIII in FIG. 2. As illustrated in FIG. 8, in the present example, the groove portion 18*d* is recessed to the other side in the axial direction on the end surface 18*a* and has a circular shape (annular shape) extending in the circumferential direction around the axis, that is, about the central axis L. However, in the present invention, the groove portion 18*d* may have an arc shape, for example, without being limited to a circular shape. The inner diameters of the lens frame 12*a*, the lens frame 12*b*, and the lens frame 12*c* differ from each other in accordance with the sizes of the lenses to be fixed. The constitutions are otherwise the same as each other.

Figure 9:
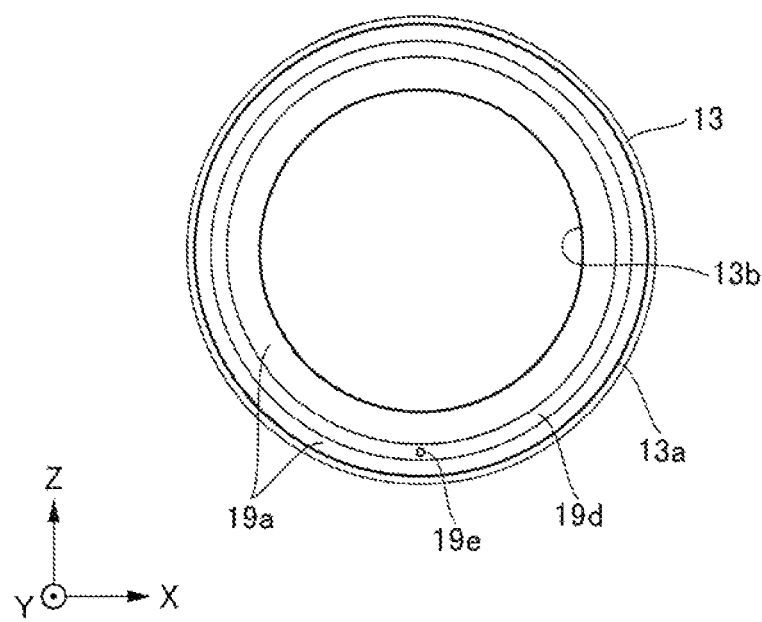
FIG. 9 is a side view of a presser ring 13 in FIG. 2 viewed from one side in an axial direction.

FIG. 9 is a side view of a presser ring 13 in FIG. 2 viewed from the one side in the axial direction. The presser ring 13 is an annular member having an end surface 19*a* which is an end surface on the one side in the axial direction and an end surface 19c which is an end surface on the other side in the axial direction and having a hole 13b which penetrates the presser ring 13 in the axial direction. The presser ring 13 has a screw portion 13a fitted into the screw portion 10c of the lens barrel 10 in the outer circumference thereof. The presser ring 13 has a penetration hole 19e penetrating the presser ring 13 from the other side in the axial direction to the one side in the axial direction at a position on the outer side of a hole 19c in the radial direction and on the inner side of the outer circumference of the presser ring 13 in the radial direction. The penetration hole 19e extends along the central axis L. In addition, the presser ring 13 has a groove portion 19d recessed to the other side in the axial direction on the end surface 19a.

(Adjustment Method for Lens Apparatus 1)

Regarding adjustment of the lens apparatus 1, for example, gap adjustment for adjusting a gap between lenses, alignment of lenses, or adjustment for rotation positions around axes of lenses is performed. In the present example, adjustment is performed in a state where lenses are accommodated in an adjusting main body which becomes a temporary substitute for the lens barrel 10 illustrated in FIG. 1 and has open portions that open such that adjustment work can be easily performed.

Since the adjusting main body has openings on a side surface, in a state of accommodating the lens frames 11, 12a, 12b, and 12c to which the lenses 14a, 14b, 14c, and 14d are fixed, it is possible to perform adjustment, such as adjusting a gap between lenses by inserting a spacer between the lens frames, adjusting eccentricity of lenses, or adjusting the rotation positions of lenses. The constitution of the adjusting main body is otherwise the same as the lens barrel 10. Therefore, detailed description of the adjusting main body will be omitted.

The adjusting main body has a barrel hole which extends along the central axis L and penetrates the adjusting main body in the axial direction. The barrel hole of the adjusting main body has a stepped portion corresponding to the stepped portion 10b of the lens barrel 10. When the lens frame 11 is accommodated in the barrel hole of the adjusting main body through the opening of the barrel hole of the adjusting main body on the other side in the axial direction while having the end surface 15a toward the one side in the axial direction, and when the accommodated lens frame 11 is caused to slide to the one side in the axial direction, the end surface 15a of the lens frame 11 on the one side in the axial direction abuts the stepped portion of the barrel hole of the adjusting main body, and therefore the lens frame 11 arrives at a position where it cannot slide any further to the one side in the axial direction.

Subsequent to the lens frame 11, when the lens frame 12a is accommodated in the barrel hole of the adjusting main body through the opening of the barrel hole of the adjusting main body on the other side in the axial direction, and when the accommodated lens frame 12a is caused to slide to the one side in the axial direction, the end surface 16a of the lens frame 12a on the one side in the axial direction abuts the end surface 15c of the lens frame 11 on the other side in the axial direction, and therefore the lens frame 12a arrives at a position where it cannot slide any further to the one side in the axial direction.

Next, subsequent to the lens frame 12a, when the lens frame 12b is accommodated in the barrel hole of the adjusting main body through the opening of the barrel hole of the adjusting main body on the other side in the axial direction, and when the accommodated lens frame 12b is caused to slide to the one side in the axial direction, the end surface 17a of the lens frame 12b on the one side in the axial direction abuts the end surface 16c of the lens frame 12a on the other side in the axial direction, and therefore the lens frame 12b arrives at a position where it cannot slide any further to the one side in the axial direction.

Next, subsequent to the lens frame 12b, when the lens frame 12c is accommodated in the barrel hole of the adjusting main body through the opening of the barrel hole of the adjusting main body on the other side in the axial direction, and when the accommodated lens frame 12c is caused to slide to the one side in the axial direction, the end surface 18a of the lens frame 12c on the one side in the axial direction abuts the end surface 17c of the lens frame 12b on the other side in the axial direction, and therefore the lens frame 12c arrives at a position where it cannot slide any further to the one side in the axial direction.

In a state where the lens frames 11, 12a, 12b, and 12c are accommodated in the barrel hole of the adjusting main body, the presser ring 13 is screwed into the opening of the barrel hole of the adjusting main body on the other side in the axial direction. When the presser ring 13 is screwed thereinto, the end surface 19a of the presser ring 13 on the one side in the axial direction abuts the end surface 18c of the lens frame 12c on the other side in the axial direction, and the lens frames 11, 12a, 12b, and 12c are fixed between the stepped portion of the barrel hole of the adjusting main body and the presser ring 13. At this time, when the lens frames 11, 12a, 12b, and 12c are moved in accordance with adjustment, the adjustment can be easily performed by loosening the presser ring 13. Regarding a specific adjustment method, a known method may be used, and therefore detailed description will be omitted.

After adjustment of the lens frames 11, 12a, 12b, and 12c to which the lenses 14a, 14b, 14c, and 14d are fixed and which are accommodated in the barrel hole of the adjusting main body is completed, the loosely screwed presser ring 13 is tightened, and the lens frames 11, 12a, 12b, and 12c are fixed inside the adjusting main body. Thereafter, vacuum suction is performed using a vacuum pump, for example, through the opening of the presser ring 13 on the end surface 19c side in the penetration hole 19e of the presser ring 13. Due to this vacuum suction performed via the penetration hole 19e, the lens frame 12c is vacuum-fixed to the presser ring 13.

In addition, due to the vacuum suction performed via the penetration hole 19e, vacuum suction performed via the penetration hole 18e of the lens frame 12c is also performed. Due to this vacuum suction performed via the penetration hole 18e, the lens frame 12b is vacuum-fixed to the lens frame 12c.

In addition, due to the vacuum suction performed via the penetration hole 18e, vacuum suction performed via the penetration hole 17e of the lens frame 12b is also performed. Due to this vacuum suction performed via the penetration hole 17e, the lens frame 12a is vacuum-fixed to the lens frame 12b.

In addition, due to the vacuum suction performed via the penetration hole 17e, vacuum suction performed via the penetration hole 16e of the lens frame 12a is also performed. Due to this vacuum suction performed via the penetration hole 16e, the lens frame 11 is vacuum-fixed to the lens frame 12a.

It is desirable that radial positions of the openings of the penetration hole 16e, the penetration hole 17e, and the penetration hole 18e on the other side in the axial direction coincide with the groove portion 17d, the groove portion

18d, and the groove portion 19d respectively, such that they communicate with each other. However, when vacuum suction is performed through the opening of the presser ring 13 on the end surface 19c side due to leakage suctioning at the time of vacuum suction even if they do not coincide with each other, suction through the penetration hole 16e, the penetration hole 17e, and the penetration hole 18e is also performed, and vacuum fixing is performed.

Due to vacuum suction, the presser ring 13, the lens frame 12c, the lens frame 12b, the lens frame 12a, and the lens frame 11 are vacuum-fixed. In this state, even if the presser ring 13 screwed to the adjusting main body is released and the presser ring 13 is pulled out through the opening of the barrel hole of the adjusting main body on the other side in the axial direction, the lens group of the lens frame 11, the lens frame 12a, the lens frame 12b, and the lens frame 12c is maintained in a state of being integrated with the presser ring 13 due to vacuum fixing, in a state where adjustment is completed. In this state without any change, the lens group of the lens frame 11, the lens frame 12a, the lens frame 12b, and the lens frame 12c is inserted into the barrel hole 10d through the opening of the barrel hole 10d of the lens barrel 10 on the other side in the axial direction while having the end surface 15a of the lens frame 11 toward the one side in the axial direction. Subsequently, the presser ring 13 is screwed until the end surface 15a of the lens frame 11 abuts the stepped portion 10b of the barrel hole 10d, and the lens frame 11, the lens frame 12a, the lens frame 12b, and the lens frame 12c are fixed inside the lens barrel 10. Thereafter, vacuum suction of the vacuum pump ends. Accordingly, the lens group of the lens frame 11, the lens frame 12a, the lens frame 12b, and the lens frame 12c can be accommodated in the lens barrel 10 in a state where adjustment is completed. Final eccentricity adjustment of the lens group can be performed by touching the outer circumferential surface of the lens frame 12c via the eccentricity adjustment holes 10a, 10e, 10f, and 10g.

In the present example, four lens frames (lens frames 11, 12a, 12b, and 12c) are accommodated in the barrel hole 10d of the lens barrel 10. However, the present invention is not limited thereto and need only have a constitution in which two or more lens frames are accommodated in the barrel hole 10d.

OTHER EMBODIMENTS

The present invention is not limited to the foregoing example and includes various modification examples. For example, the foregoing example has been described in detail for description of facilitating understanding of the present invention and is not necessarily limited to that including all the described constitutions. In addition, a part of a constitution of a certain example can replace a constitution of another example. In addition, a constitution of another example can be added to a constitution of a certain example. In addition, a part of a constitution of each example can be subjected to addition, deletion, and replacement of other constitutions.

Overview of Embodiment

An embodiment of the present invention includes a plurality of lenses that are disposed such that optical axes are aligned in an axial direction, a first lens frame that holds a first lens of the plurality of lenses, and a second lens frame that holds a second lens of the plurality of lenses. The first lens frame comes into contact with the second lens frame and is disposed on the one side of the second lens frame in the axial direction. The second lens frame includes a penetration hole penetrating the second lens frame from the other side in the axial direction to the one side in the axial direction. Air is suctioned and discharged via the penetration hole such that the first lens frame and the second lens frame are temporarily fixed through vacuum adsorption.

According to the present embodiment, lens positions can be easily and accurately adjusted in a lens apparatus having a plurality of lenses.

In addition, according to the present embodiment, for example, the first lens frame and the second lens frame are accommodated in an adjusting main body having openings on a side surface, and adjustment is performed. At this time, there is no need to temporarily fix the first lens frame and the second lens frame, and there is no need to go against a fixing force, but precise adjustment can be easily performed.

In addition, according to the present embodiment, after adjustment in a state of being accommodated in the adjusting main body, the first lens frame can be adsorbed on one side of the penetration hole of the second lens frame in the axial direction by suctioning air using a vacuum pump, for example, from the other side of the penetration hole of the second lens frame in the axial direction, and the first lens frame and the second lens frame can be fixed in an adjusted state. The adjusted state can be maintained by pulling out a lens group from the adjusting main body and accommodating the lens group in a lens barrel in this fixed state. The number of second lens frames may be increased when there are three or more lenses.

In addition, in the embodiment of the present invention, the second lens frame has a groove portion which communicates with the penetration hole and is recessed to the other side in the axial direction on a surface on the one side in the axial direction.

According to the present embodiment, the first lens frame can be adsorbed on the one side of the penetration hole of the second lens frame in the axial direction and in the groove portion on the one side of the second lens frame in the axial direction by suctioning air using a vacuum pump from the other side of the penetration hole of the second lens frame in the axial direction, and therefore the first lens frame and the second lens frame can be more stably fixed in an adjusted state.

In addition, in the embodiment of the present invention, the groove portion has an annular shape.

According to the present embodiment, the first lens frame can be adsorbed on the one side of the penetration hole of the second lens frame in the axial direction and in the annular groove portion of the second lens frame by suctioning air using a vacuum pump from the other side of the penetration hole of the second lens frame in the axial direction, and therefore the first lens frame and the second lens frame can be more stably fixed in an adjusted state.

In addition, the embodiment of the present invention further includes a main body that has a barrel shape with a barrel hole penetrating the main body in the axial direction. The first lens and the second lens frame are accommodated in the barrel hole.

According to the present embodiment, it is possible to provide a lens apparatus in which a lens group is accommodated in a main body (lens barrel).

In addition, the embodiment of the present invention further includes a fixing portion that fixes the first lens and the second lens frame to the main body.

According to the present embodiment, after the first lens and the second lens frame fixed in an adjusted state are accommodated in the main body (lens barrel), and the first lens and the second lens frame are fixed inside the main body (lens barrel) using the fixing portion, suctioning by a vacuum pump is stopped, and therefore an adjusted state can be maintained.

In addition, in the embodiment of the present invention, the second lens frame is a plurality of lens frames arranged in the axial direction.

According to the present embodiment, it is also possible to cope with a case where there are three or more lenses.

What is claimed is:

1. A lens apparatus comprising:
   a plurality of lenses that are disposed such that optical axes are aligned in an axial direction;
   a first lens frame that holds a first lens of the plurality of lenses; and
   a second lens frame that holds a second lens of the plurality of lenses,
   wherein the first lens frame comes into contact with the second lens frame and is disposed on one side of the second lens frame in the axial direction,
   wherein the second lens frame includes a penetration hole penetrating the second lens frame from the other side in the axial direction to the one side in the axial direction, and
   wherein air is suctioned and discharged via the penetration hole such that the first lens frame and the second lens frame are temporarily fixed through vacuum adsorption.

2. The lens apparatus according to claim 1,
   wherein the second lens frame has a groove portion which communicates with the penetration hole and is recessed to the other side in the axial direction on a surface on the one side in the axial direction.

3. The lens apparatus according to claim 2,
   wherein the groove portion has an annular shape.

4. The lens apparatus according to claim 1, further comprising:
   a main body that has a barrel shape with a barrel hole penetrating the main body in the axial direction,
   wherein the first lens and the second lens frame are accommodated in the barrel hole.

5. The lens apparatus according to claim 4, further comprising:
   a fixing portion that fixes the first lens and the second lens frame to the main body.

6. The lens apparatus according to claim 1,
   wherein the second lens frame is a plurality of lens frames arranged in the axial direction.

* * * * *